Feb. 12, 1952     M. M. RICHARDSON     2,585,683
DETACHABLE LOCKING DEVICE FOR FURNITURE ELEMENTS
Filed Feb. 15, 1949
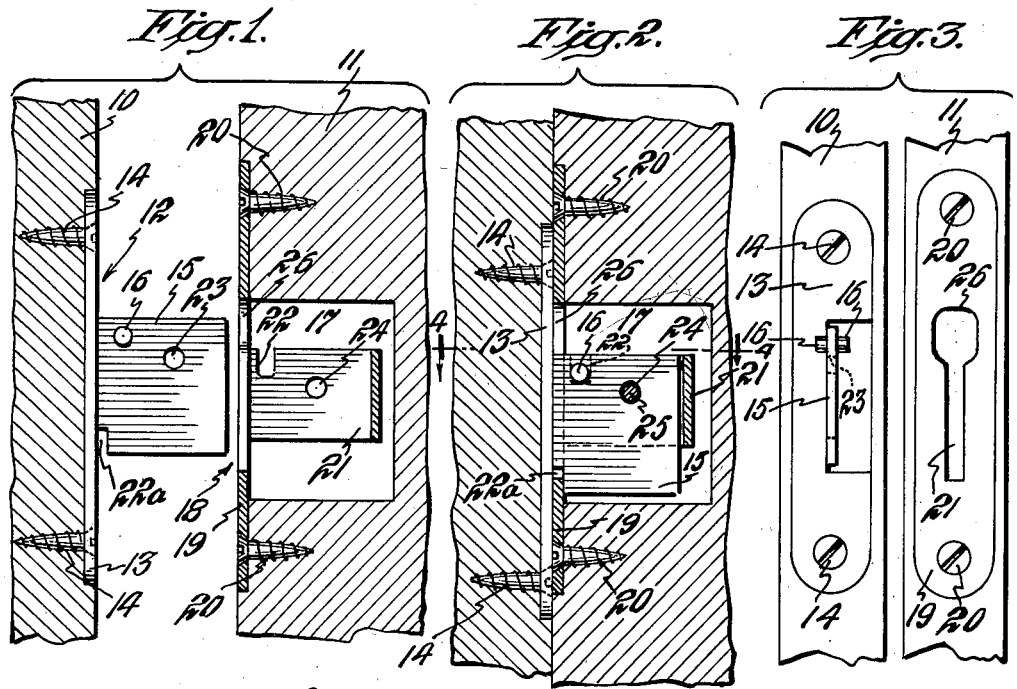
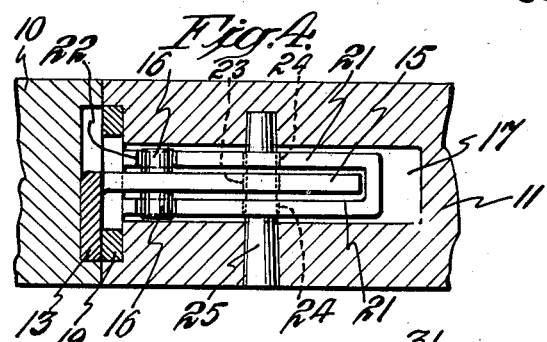
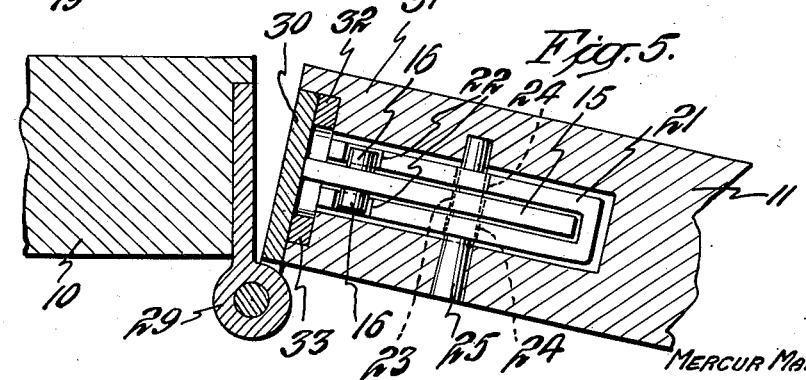
INVENTOR.
MERCUR MAHLON RICHARDSON
BY
ATTORNEY Patented Feb. 12, 1952

2,585,683

UNITED STATES PATENT OFFICE 2,585,683

DETACHABLE LOCKING DEVICE FOR FURNITURE ELEMENTS

Mercur Mahlon Richardson, East Northport, N. Y.

Application February 15, 1949, Serial No. 76,605

1 Claim. (Cl. 20—92.7)

The present invention relates to a new and improved locking device suitable for detachably connecting elements of furniture or the like together in a manner such that the connection between the respective elements, while firmly established, is easily made and broken, as desired.

The invention is especially characterized by the use of interlocking male and female members in a manner such that movement of the adjoining surfaces relative to each other is precluded after the connection is made.

The invention also contemplates application of the interlocking male and female members to hinge constructions in a manner such that the male member is made an integral part of one of the hinged leaves, while the female member may be mounted within a door jamb or other desirable supporting surface or the like so that the hinged member may be firmly and rigidly mounted with respect to the support, but may be easily and conveniently removed as a unit.

It is a primary object of the present invention to provide a locking device for connecting together the elements of wardrobes, tables, chairs and other pieces of furniture or the like.

Another object is to provide an improved form of locking device which is inexpensive to make, simple in construction and easy to manipulate.

Other objects and advantages of the invention will become increasingly apparent upon consideration of the following description, taken in connection with the accompanying drawings, wherein Fig. 1 is an elevational view partly in section showing my improved locking device mounted in the respective adjoining surfaces of two wooden elements.

Fig. 2 is a view similar to that of Fig. 1, showing the adjoining elements in interlocking relationship.

Fig. 3 is an end elevation of the furniture element intended to be joined, showing the male and female elements of my improved locking device disposed thereon.

Fig. 4 is a sectional view taken on the line 4—4 of Fig. 2.

Fig. 5 is a modification showing my improved device applied to a hinge structure.

In accordance with the present invention I provide, on the one hand, a flat base member adapted to be secured to or in the wooden surface desired to be joined by means of screws, for example, and having a projecting tongue or key-like member formed integral therewith, and a lock pin mounted upon said key-like member. The surface of the other member adapted to be joined with the member just described, is provided with a female connecting element which includes a base member similar to the base member of the male element also adapted to be secured to the surface of the member to be joined by screws or the like. The female member includes a bridge-like depression extending into the surface of the adjoining member and providing a socket for the reception of the tongue or key-like element mounted on the adjoining surface. The tongue or key-like member of the male element is formed with a lateral pin or projection which enters a slot in the opposite or complementary member and after the opposing elements are brought together so that the bases of the respective male and female elements are in engagement, the adjoining elements are given a sliding movement to cause this pin or projection to enter the corresponding slot in the depression or socket of the complementary element. The tongue of the male element is preferably undercut at the rear so as to interlock with the base of the female element. This insures that the respective elements of the furniture desired to be joined together are firmly positioned relative to each other in view of the fact that the connection cannot be broken unless the complementary members are given a sliding movement in the opposite direction to disengage the pin or projection from the slot.

Referring specifically to the drawings and in particular to Figs. 1 and 2, the adjoining surfaces of two wooden elements 10 and 11 are shown in partial section with the element 10 providing a male connecting element, shown generally at 12, which includes a flat base member 13 suitably set in or countersunk in the surface of the wooden element 10 and secured thereto by means of screws 14. The flat base member 13 is provided with an integral projecting tongue or key-like member 15 extending at right angles to the base and of sufficient length so as to preclude angular movement of the adjoining elements when the device is interlocked with the adjoining member. The tongue or key-like member 15 is provided near its lower portion adjacent the base member 13 with a pin or projection 16 for a purpose to be presently described.

The surface of the adjacent wooden element 11, on the other hand, is countersunk or cut out as at 17 for the reception of a corresponding female locking member shown generally at 18. This member 18 is formed with a flat base 19 which is secured to the wooden element 11 by means of screws 20 and is provided with an integral bridge-like depression or socket 21, which is adapted to receive the projecting tongue or key 15 of the complementary element 12 when the flat base members 13 and 19 are brought into close engagement as will be readily understood. The bridge-like depression or socket 21 is formed with a transverse slot 22 so that when the adjoining surfaces of the wood elements 10 and 11 are brought together and the projecting tongue or key-like member 15 inserted into the bridge-like socket or depression 21 the adjoining wooden elements are given a sliding motion relative to each other to cause the pin or projection 16 to securely enter the transverse slot 22. In the same movement an undercut 22a in the tongue 15 interlocks with the base 19 as shown in Fig. 2. This results in firmly interlocking the male and female members and eliminating any possiblity of the adjoining wooden elements becoming displaced relative to each other unless they are given a positive reverse movement to disengage the elements described.

Referring to Figs. 1 and 4, the key 15 may have an opening 23 formed therein which is adapted to become aligned with a complementary opening 24 when the elements are joined together so that the elements may be securely locked in this position by means of a suitably tapered pin 25 as shown in Fig. 4.

Referring to Fig. 3 it will be seen that the socket or recess 21 is formed at one end with an enlarged portion 26 to facilitate the entrance of the pin or projection 16 of the opposing element when the interlocking members are brought into engagement.

Referring to Fig. 5, a modified form of the invention is shown wherein the base of the tongue or key-like member 15 constitutes the leaf 30 of a hinge 29. In this form the surface of the wooden element 31, which may be a door jamb, furniture leg or the like, is countersunk at 32 to a sufficient extent for the reception of the leaf 30, forming the base of the male interlocking member, and the base 33 of the female member. In this case, as before, the tongue 15 has a pin or projection 16 adapted to interlock with a corresponding slot 22 and the respective elements may be secured together by a lock pin or set screw 25.

It will be appreciated my device is especially useful in the handling and shipping of knock down furniture, prefabricated housing and other construction materials as the elements may be readily assembled in a permanent manner. This results in substantial savings in labor and construction costs.

Although a relatively simple embodiment of the present invention has been shown for purposes of illustration, it is understood that many changes may be made without departing from the spirit and scope of the invention as defined in the accompanying claim.

I claim:

A detachable locking device comprising a relatively flat base member adapted to be secured to the surface of one element and provided with a relatively flat projecting tongue, a corresponding relatively flat base member adapted to be secured to the surface of another element to be joined to said first element and having a rearwardly extending substantially U-shaped portion forming a recess for the reception of the projecting tongue of the first element, a projection formed on the relatively flat tongue, an opening formed in the corresponding base member above the U-shaped portion so that when the parts are brought into engagement the projection moves entirely thereabove in the direction of insertion, a slot formed in the U-shaped portion disposed transversely to the direction of insertion of said tongue, said slot forming receiving means for said projection to provide a first engaging means, said tongue having an undercut therein for engaging and receiving part of the base of said corresponding flat base member to provide a second engaging means, and said tongue having an aperture and said rearwardly extending portion having an aperture which are aligned when said projection is in said slot, and means adapted to pass through said aligned apertures to provide a third engaging means.

MERCUR MAHLON RICHARDSON.

REFERENCES CITED

The following references are of record in the file of this patent:

UNITED STATES PATENTS

| Number | Name | Date |
|---|---|---|
| 1,736,306 | Chason | Nov. 19, 1929 |
| 2,132,131 | Schilling | Oct. 4, 1938 |

FOREIGN PATENTS

| Number | Country | Date |
|---|---|---|
| 21,105 | Austria | 1905 |